United States Patent [19]

Kroiss et al.

[11] Patent Number: 5,522,425
[45] Date of Patent: Jun. 4, 1996

[54] DELIVERY UNIT WITH FUEL TANK LEVEL TRANSMITTER

[75] Inventors: Hugo Kroiss, Groebenzell; Guenther Tuschl, Kolbermoor, both of Germany

[73] Assignee: Bayerische Motoren Werke AG, Germany

[21] Appl. No.: 330,937

[22] Filed: Oct. 28, 1994

[30] Foreign Application Priority Data

Oct. 28, 1993 [DE] Germany .......................... 43 36 858.1

[51] Int. Cl.$^6$ .................................................. F02M 37/04
[52] U.S. Cl. .......................... 137/590; 137/565; 137/574; 123/514
[58] Field of Search .................................... 123/509, 514; 137/573, 574, 590, 565

[56] References Cited

U.S. PATENT DOCUMENTS

| | | | |
|---|---|---|---|
| 3,470,907 | 10/1969 | Shockey | 137/590 |
| 4,750,513 | 6/1988 | Griffin et al. | |
| 4,869,225 | 9/1989 | Nagata et al. | 123/514 |
| 4,945,884 | 8/1990 | Coha et al. | 137/590 |
| 5,038,741 | 8/1991 | Tuckey . | |
| 5,080,077 | 1/1992 | Sawert et al. | 123/514 |
| 5,195,494 | 3/1993 | Tuckey | 123/514 |
| 5,237,977 | 8/1993 | Tuckey | 123/514 |

FOREIGN PATENT DOCUMENTS

| | | |
|---|---|---|
| 2740653 | 3/1979 | Germany . |
| 2750081 | 5/1979 | Germany . |
| 3927218A1 | 2/1991 | Germany . |

*Primary Examiner*—A. Michael Chambers
*Attorney, Agent, or Firm*—Evenson, McKeown, Edwards & Lenahan

[57] ABSTRACT

A delivery unit has a level transmitter in which it is possible that angular deviations of the flange and/or of the bottom of the fuel tank from the desired position have no no effect on the measuring precision of the level transmitter arranged on the delivery unit. The connection between the flange and the pump holder is longitudinally movable and rotatable, and the lower end of the pump holder can be centered in a swivellable manner on a bottom of the fuel tank or of a baffle pot.

20 Claims, 2 Drawing Sheets

5,522,425

DELIVERY UNIT WITH FUEL TANK LEVEL TRANSMITTER

BACKGROUND AND SUMMARY OF THE INVENTION

The present invention relates to a delivery unit having a level transmitter, and more particularly, to a lever transmitter for installation in a fuel tank, comprising a connection between a flange and a pump holder and provided with a spring against whose force the flange and the pump carrier are movable in a longitudinal direction of the delivery unit.

DE-OS 27 40 653 shows a liquid-level measuring device in which, via a longitudinal guide constructed on a fastening flange, a housing comprising a motor-driven pump arranged thereon is elastically supported on a fuel tank bottom. However, the longitudinal guide comprising two opposite oblong holes and a pin which can be displaced in the oblong holes disadvantageously permits only a longitudinal movement in the perpendicular direction. Therefor, compensation of tolerances or of deformations of the fuel tank is possible only in the perpendicular direction. Because of the long lever arms of the level transmitter fastened to the pump holder, however, even slight angle changes of the pump holders out of the intended position result in considerable measuring errors.

It is an object of the present invention to provide a delivery unit comprising a level transmitter in the case of which angle deviations from the desired position of the flange for the fastening of the delivery unit on the fuel tank and/or of the bottom of the fuel tank do not affect the measuring precision of the level transmitter arranged on the delivery unit.

This object has been achieved according to the present invention by providing that the connection between the flange and the pump holder is configured to be longitudinally movable and rotatable, and a lower end of the pump holder is swivellably centerable on a bottom of one of the fuel tank or of a baffle pot.

Because of the construction of the delivery unit according to the present invention as a complete preassembled unit, a fast mounting in the fuel tank in the correct position is achievable. The capacity of the delivery unit to be preassembled results in a compact construction which provides a simple transportability and storability. In addition, after the preassembling, a testing of the delivery unit is now advantageously possible with respect to both function and measuring precision of the level transmitter.

In an arrangement of the delivery unit according to the present invention in a baffle pot fastened in the fuel tank, as the result of the shape of the baffle pot and the correspondingly adapted shape of an end of the pump holder constructed as a supporting foot, a guide can be developed which prevents an incorrect mounting of the delivery unit in the baffle pot. Preferably, the shape of the baffle pot or, when a baffle pot is absent, of a corresponding construction on the bottom of the fuel hank and of the supporting foot is wedge-shaped or conical in the top view and/or circular in the lateral view as is also the same with a delivery unit in the case of which a baffle pot is integrated in the lower end of the pump holder. As a result of the space or the clearance between the lower end of the pump holder constructed as a supporting foot or baffle pot and the corresponding counterguide constructed on the fuel tank or on the baffle pot, a simple moving or swivelling of the fuel tank or the baffle pot about the lower end of the pump holder can be achieved.

Because of the construction according to the present invention of a spring-stressed longitudinally displaceable pivot bearing between the fastening flange and the upper end of the pump holder, the delivery unit is braced against the bottom of the fuel tank or of the baffle pot such that the delivery unit will always be in the desired installed position independently of the tolerances and deformations of the fuel tank.

As the result of the additional support of the delivery unit via the lower end of the pump holder configured as a supporting foot or as a baffle pot on the bottom of the fuel tank, a relieving of the flange seal and of the screwed connection is achieved. Advantageously, in the case of the delivery unit according to the invention, the fuel pump is disposed by way of a pump carrier and damping elements on or in the pump holder. The construction of the pump carrier itself and of the damping elements as well as their arrangement on the pump carrier may be effected in a conventional manner as, for example, according to DE-OS 39 27 218.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
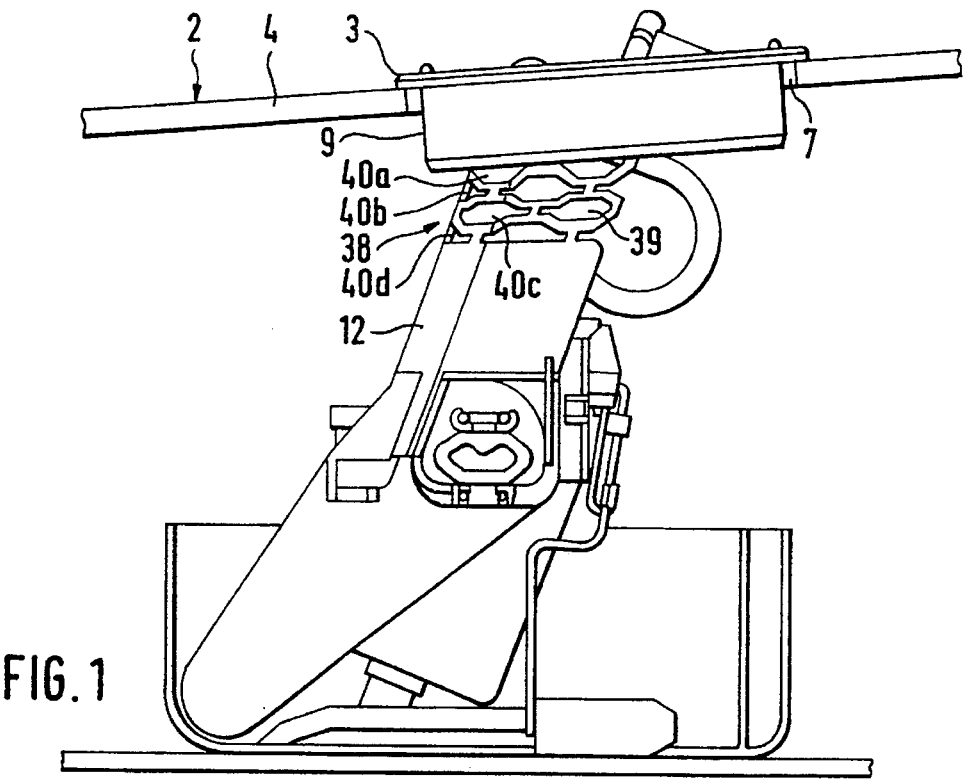
FIG. 1 is a side view of a first embodiment of a delivery unit in which a one-piece connection is between a flange and a pump holder.

Referring now to FIG. 1, a delivery unit is designated generally by numeral 1 in which a pump holder 12 is arranged in one piece on a flange 3 in a longitudinally displaceable and rotatable manner. The connection between the upper end of the pump holder 12 and the flange 3 takes place via a component which is flexible and elastic corresponding to the occurring deformations. A housing section 38 is molded to a collar 9 of the flange 3 and is provided with a plurality of recesses 39 which can have a substantially rectangular shape, although the recesses can also have circular, oval or rhombic shapes. The recesses 39 are arranged in a row horizontally on the circumference of the housing section 38. In the embodiment illustrated in FIG. 1, several rows 40a, 40b, 40c, 40d are arranged below one another and in an angularly offset manner on the housing section 38. In still another embodiment, a longitudinally displaceable, rotatable and elastic element made of rubber or a rubber-like material is provided between the flange 3 and the pump holder 12.

Figure 2:
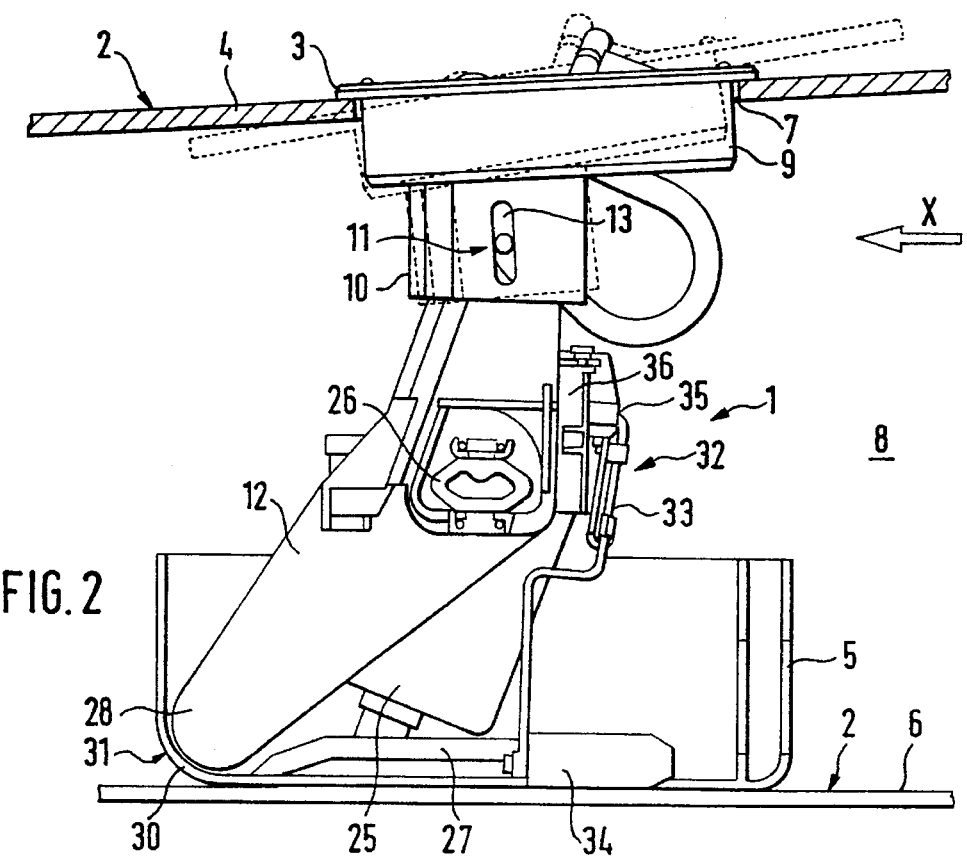
FIG. 2 is a partial sectional side view of a second embodiment of a delivery unit in accordance with the present invention arranged in a fuel tank.
Figure 3:
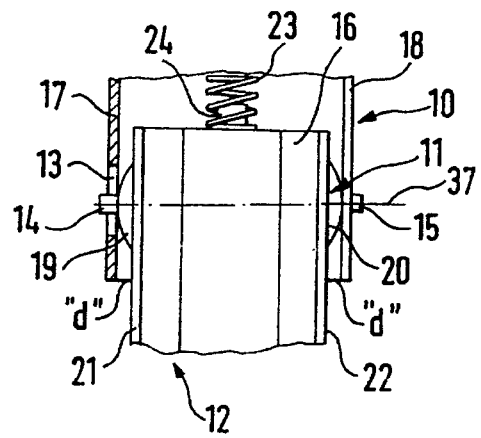
FIG. 3 is a partial sectional view of a longitudinally displaceable pivot bearing in the direction of the arrow marked "X" in FIG. 2, in which case the pivot bearing is constructed between the fastening flange and an upper end of a pump holder.

FIG. 2 shows a delivery unit 1 which is arranged in a fuel tank 2. The upper end of the delivery unit 1 is fastened to the top side 4 of the fuel tank 2 by way of a flange 3. The delivery unit 1 is situated in a baffle pot 5, which is fastened to the interior surface of the bottom side or of the bottom 6 of the fuel tank 2, and is introduced into the interior 8 of the fuel tank 2 through an opening 7 constructed in the top side of the fuel tank 2. The surrounding flange 3 is adjoined by a preferably ring-shaped collar 9 onto which a projection 10 is molded for the development of an upper bearing 11. The projection 10 is preferably an open profile, such as a U-profile. However, the projection 10 may also have a closed cross-section, such as a rectangular profile. As seen in FIG. 3, the upper end 16 of the pump holder 12 arranged on the projection 10 will then have a corresponding cross-section. The pump holder 12, together with a fuel pump 25 arranged thereon, is disposed in a displaceable and rotatable manner by way of the upper bearing 11.

In FIGS. 2 and 3, the upper bearing designated generally by numeral 11 is formed by longitudinal grooves 13 provided in the projection 10 of the flange 3 at opposite sides 17, 18 of the projection 10. A round pin or a pin of other appropriate configuration 14, 15 respectively is guided in a displaceable and swivellable manner in the longitudinal grooves 13 which are preferably closed at their two ends. For example, should the respective lower end of the longitudinal grooves 13 be open, corresponding stops must be provided which ensure the cohesion of the flange 3 with the pump holder 12. The upper end 16 of the pump holder 12, which is guided and disposed in the projection 10, has spherical elevations 19, 20, as illustrated in FIG. 3, on its opposite sides 21, 22 onto which the pins 14, 15 are molded. The spherical elevations 19, 20 permit a swivellability of the projection 10 and/or of the upper end 16 of the pump holder in the direction of the lateral walls 17, 18 of the projection 10. A sufficient distance "d" exists for this swivellability function between the sides 17, 18 of the projection 10 and the sides 21, 22 of the upper end 16.

In a further embodiment of the present invention, the longitudinal grooves 13 are constructed in the upper end 16 of the pump holder 12, and the spherical elevations 19, 20 and the pins 14, 15 which continue thereon are constructed in the projection 10 of the flange 3.

The pump holder 12 is braced, by way of a spring 23, against the bottom or the underside 6 of the fuel tank 2 and, in the other direction, against the flange 3 or the top side of the fuel tank 2. As illustrated in FIG. 3, the upper end 16 of the pump holder 12 has a pin 24 in which the lower end of the spring 23 is held and guided. The upper end (not shown) of the spring 23 is held and guided in a suitable manner on the flange 3 or on the projection 10 in a manner which should now be apparent to one skilled in the art.

In FIG. 2, the dotted lines indicate a deformation of the top side 4 of the fuel tank 2 which results in a swivelling of the flange 3. Because of the longitudinally displaceable and rotatable bearing 11, the pump holder 12 and the level transmitter 32 arranged thereon remain in their desired installed position.

By way of a pump carrier and damping elements 26, the pump 25 is disposed approximately in the center of the pump holder 12, as seen, for example, in FIG. 5 of the aforementioned DE-OS 39 27 218. An intake sieve 27 is arranged at the lower end of the pump 25. The lower end 28 of the pump holder 12 is constructed as a supporting foot which is used as a second bearing 31.

In yet another embodiment, a baffle pot is integrated in the lower end of the pump holder 12. This baffle pot is guided on the bottom 6 of the fuel tank 2 in a swivellable and rotatable manner.

Figure 4:
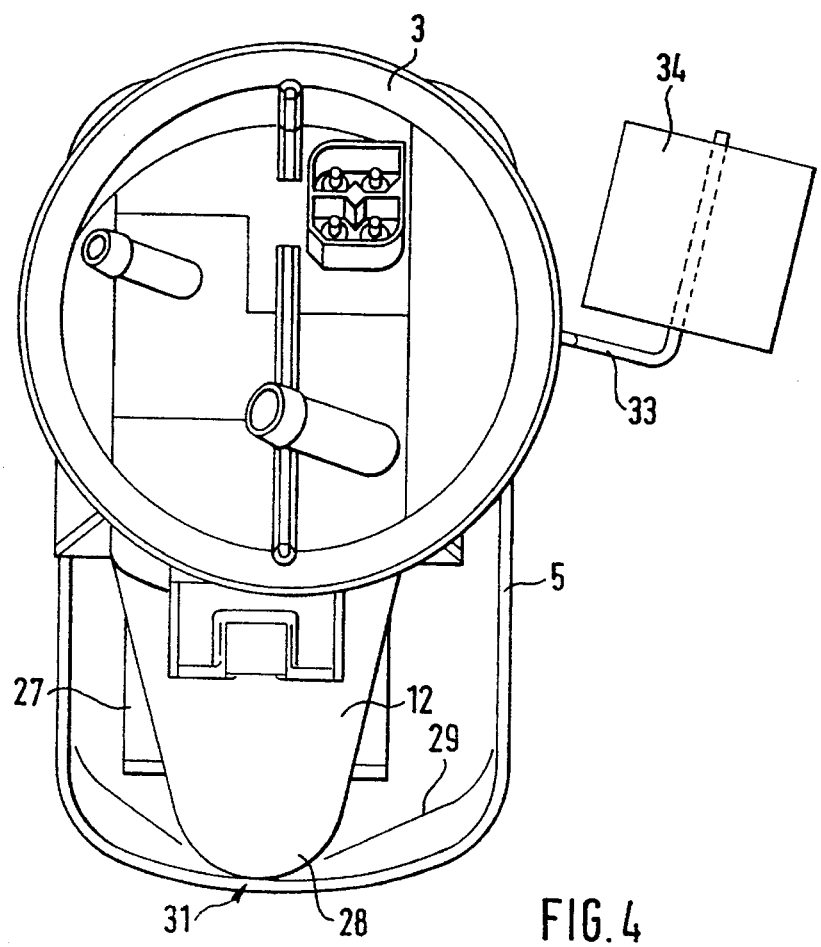
FIG. 4 is a partial sectional basic representational top view of a delivery unit arranged in a baffle pot.

As indicated in FIG. 4, the lower end 28 of the pump holder 12 is arranged form lockingly, i.e. in an indentation 29 of the baffle pot 5 in a swivellable or tiltable manner, thereby making it possible that the deformations and/or movements of the bottom 6 of the fuel tank 2 have no effect on the position of the pump holder 12. In plan view, the indentation 29 is approximately triangular or wedge-shaped. The lower end 28 of the pump holder 12 has a corresponding but narrower shape to prevent swivel movements.

As seen in FIG. 2, the lower end 28 of the pump holder 12 is adapted to the shape of the lateral wall 30 of the baffle pot 5 resulting in a swivellable contact or support of the pump holder 12 on the lateral wall 30. Should a baffle pot 5 not be provided in the fuel tank 2, or should the baffle pot be integrated in the pump holder 12, a corresponding bearing 31 is constructed on the bottom 6 of the fuel tank 2.

FIG. 2 also shows that a level transmitter 32 is arranged approximately in the center of the pump holder 12. The level transmitter 32 has an angle transmitter arm 33 on whose lower end a float 34 is arranged. A swivel bearing 35 is constructed on the upper end of the angle transmitter arm 33. The angular position of the angle transmitter arm 33 can be measured in a known manner by way of a thick-film resistor arranged on the housing 36 of the pump holder 12, with the signal tapped at the thick-film resistor being used for indicating the filling level.

In still another embodiment of the present invention, the upper bearing 11 consists only of a pin guided in a longitudinal groove. The longitudinal groove and the pin are arranged to be rotated by 90° with respect to the embodiment of FIG. 2. The projection 10 can then swivel relative to the upper end 16 of the pump holder 12 about the longitudinal axis of the pin. The exterior lateral walls which, as in the case of the embodiment of FIG. 2, may be formed by the projection 10 or by the upper end 16 of the pump holder 12, will then be used as a stop. A swivellability perpendicular to this direction can be achieved by a spherical elevation or by an elastic and/or flexible construction of the corresponding exterior lateral wall.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A delivery unit having a level transmitter for installation in a fuel tank, comprising a connection between a flange and a pump holder and provided with a spring against whose force the flange and the pump carrier are movable in a longitudinal direction of the delivery unit, wherein the connection between the flange and the pump holder is configured to be longitudinally movable and rotatable, and a lower end of the pump holder is form-lockingly arranged so as to swivellably centerable on a bottom of one of the fuel tank and of a baffle pot.

2. The delivery unit according to claim 1, wherein a one-piece housing section constitutes a transition between the flange and the pump holder, which housing section is elastically configured at least in the longitudinal direction so as to be longitudinally displaceable and is also rotatable.

3. The delivery unit according to claim 2, wherein the housing section has offset recesses.

4. The delivery unit according to claim 3, wherein the recesses have an oblong shape in the form of one of a rectangular or rhombus and are aligned in a longitudinal direction thereof approximately parallel to a circumference of the housing section.

5. The delivery unit according to claim 3, wherein the recesses are arranged at the same level in rows behind one another at regular spacing with respect to one another, and at least several of the rows are arranged below one another in an angularly offset manner.

6. The delivery unit according to claim 5, wherein the recesses have an oblong shape in the form of one of a rectangular or rhombic and are aligned in a longitudinal direction thereof approximately parallel to a circumference of the housing section.

7. The delivery unit according to claim 1, wherein the connection between the flange and the pump holder comprises at least one pin guided in a correspondingly longitudinal groove in a longitudinally displaceable manner and rotatably arranged at least about a longitudinal axis of the pin.

8. The delivery unit according to claim 7, wherein the at least one pin is arranged on a spherical elevation such that the flange is swivellable relative to the pump holder perpendicularly to the longitudinal axis of the at least one pin.

9. The delivery unit according to claim 1, wherein a projection on the flange is configured as a closed and open profile into or about which an open or closed profile constructed on an upper end of the pump holder is guided in the longitudinally slidable and rotatable manner.

10. The delivery unit according to claim 1, wherein the lower end of the pump holder is configured as a supporting foot and is supported in a form-locking manner on one of the bottom of the fuel tank and on a correspondingly constructed lateral wall of the baffle pot.

11. The delivery unit according to claim 10, wherein the lower end of the pump holder is of rounded configuration.

12. The delivery unit according to claim 10, wherein the lower end of the pump holder is semicircular in side view and wedge-shaped in top view, and one of the lateral wall of the baffle pot and a centering constructed on the bottom of the fuel tank is configured to the lower end of the pump holder such that the lower end is guided in a swivellable manner.

13. The delivery unit according to claim 1, wherein a baffle pot is formed in the lower end of the pump holder, and the baffle pot is guided on the bottom of the fuel tank in a swivellable manner.

14. The delivery unit according to claim 13, wherein a one-piece housing section constitutes a transition between the flange and the pump holder, which housing section is elastically configured at least in the longitudinal direction so as to be longitudinally displaceable and is also rotatable.

15. The delivery unit according to claim 14, wherein the housing section has offset recesses.

16. The delivery unit according to claim 15, wherein the recesses have an oblong shape in the form of one of a rectangular or rhombic and are aligned in a longitudinal direction thereof approximately parallel to a circumference of the housing section.

17. The delivery unit according to claim 15, wherein the recesses are arranged at the same level in rows behind one another at regular spacing with respect to one another, and at least several of the rows are arranged below one another in an angularly offset manner.

18. The delivery unit according to claim 13, wherein the connection between the flange and the pump holder comprises at least one pin guided in a correspondingly longitudinal groove in a longitudinally displaceable manner and rotatably arranged at least about a longitudinal axis of the pin.

19. The delivery unit according to claim 18, wherein the at least one pin is arranged on a spherical elevation such that the flange is swivellable relative to the pump holder perpendicularly to the longitudinal axis of the at least one pin.

20. The delivery unit according to claim 13, wherein a projection on the flange is configured as a closed and open profile into or about which an open or closed profile constructed on an upper end of the pump holder is guided in the longitudinally slidable and rotatable manner.

* * * * *